Jan. 23, 1951  N. BARTLETT  2,539,360
AMUSEMENT RIDE CAR
Filed Dec. 22, 1945  2 Sheets-Sheet 1
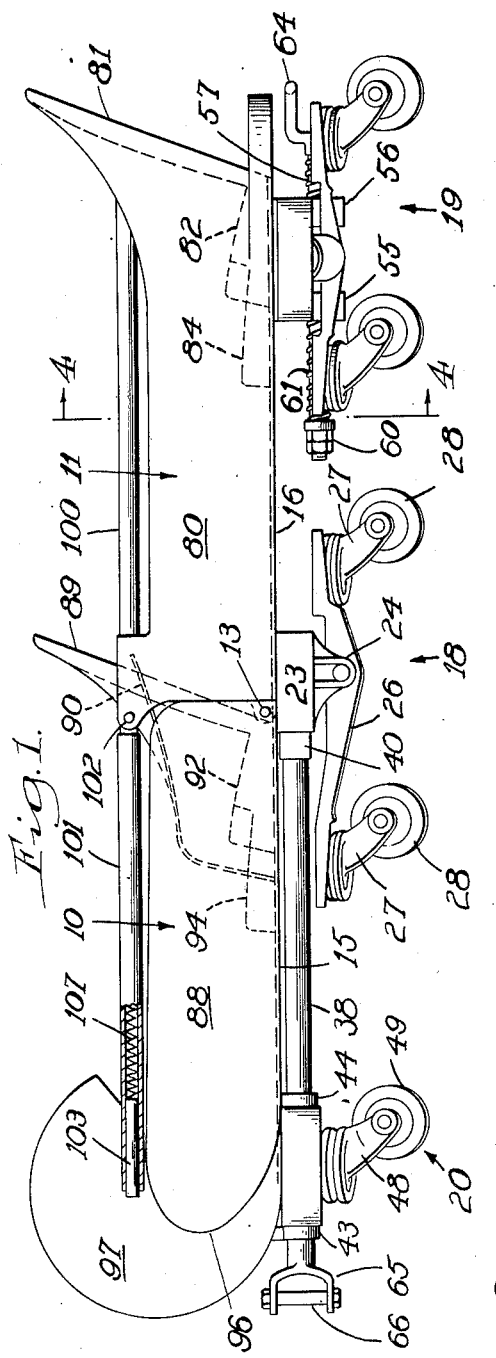
INVENTOR.
Norman Bartlett
BY
Beau, Brooks, Buckley & Beau.
Attorneys Jan. 23, 1951 N. BARTLETT 2,539,360
AMUSEMENT RIDE CAR
Filed Dec. 22, 1945 2 Sheets-Sheet 2
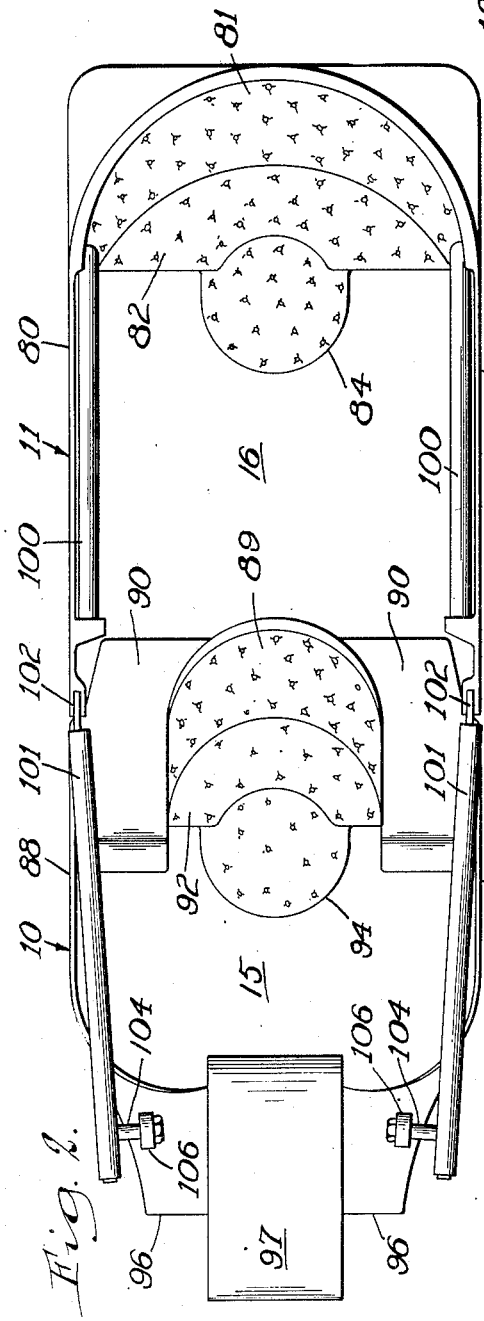
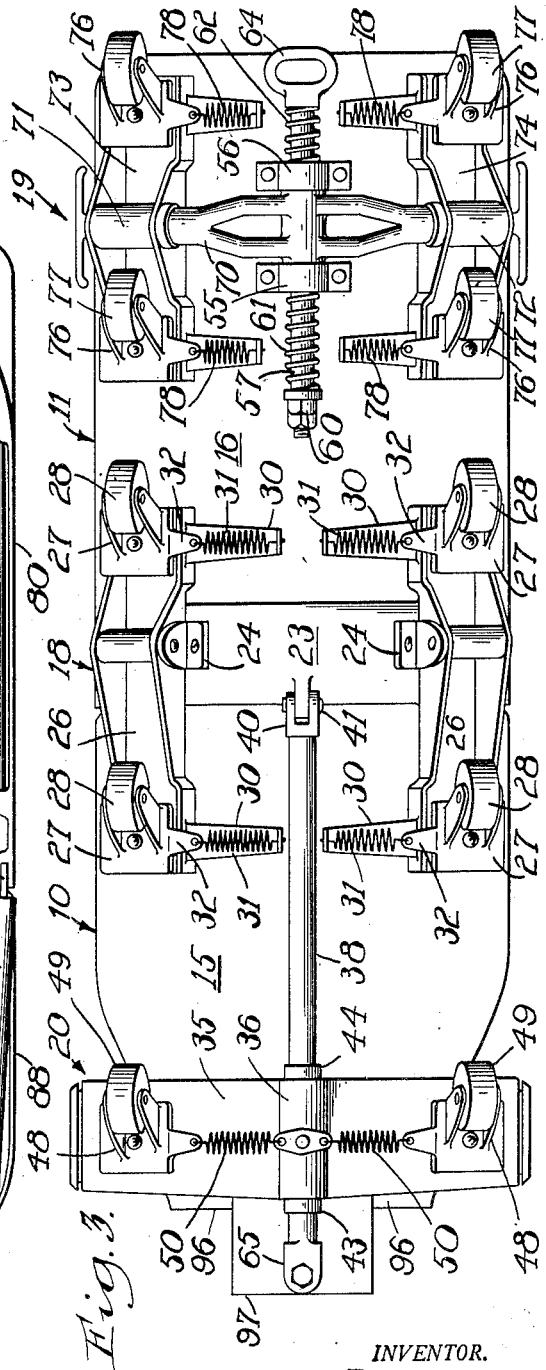
INVENTOR.
Norman Bartlett
BY
Bean, Brooks, Buckley & Bean.
Attorneys Patented Jan. 23, 1951

2,539,360

UNITED STATES PATENT OFFICE 2,539,360

AMUSEMENT RIDE CAR

Norman Bartlett, North Tonawanda, N. Y., assignor of one-half to Marjorie Bartlett, North Tonawanda, N. Y.

Application December 22, 1945, Serial No. 636,573

4 Claims. (Cl. 104—63)

This invention relates to amusement apparatus and particularly to novel passenger carrying cars.

The passenger cars of the present invention are self-steering and are intended primarily for use with an amusement ride runway or trackway of the general kind shown in my prior Patent No. 2,081,261 dated May 25, 1937. The form and arrangement of the runway may vary considerably from that shown in the above mentioned patent. The only requirement is that the cross-sectional contour of the runway be such as to cooperate with the cars of the present invention to produce self-steering operation in such manner as to prevent any car from buckling out of a line of cars or otherwise deviating from the desired course.

The car shown by way of example in the accompanying drawing and described in detail in the following description is intended to be gravity propelled, but the principles of the present invention would apply equally to cars powered for automotive operation or propelled or accelerated by any other means.

According to the present invention a car is provided which has movable ground wheels so mounted and arranged that they all automatically retain road contact regardless of the tortuosity of the curved banked surface on which the car is intended to move, generally as one of a train of like cars.

Amusement rides generally are to some extent portable and temporary in their erection so that lightness of construction is an important consideration. For this reason the load limits per wheel of cars operating thereon have certain limitations. By virtue of the present invention a car is provided which has nearly double the load capacity of cars heretofore contemplated for rides of this character without increasing the unit load on the runway or the stress set up in the latter.

Furthermore, the wheel arrangement of the present invention and the seating arrangement are such that substantially equal distribution of the load on the several wheels results. The principles of the present invention are limited only as defined in the appended claims and many mechanical modifications in the car shown and described herein by way of example may be made without departing from the spirit of the invention.

In the drawings:

Fig. 1 is a side elevational view of one form of the car of my invention;

Fig. 2 is a top plan view thereof;

Fig. 3 is a bottom plan view thereof; and

Fig. 4 is a transverse cross-sectional view on the line 4—4 of Fig. 1.

In the several figures of the drawings, like characters of reference denote like parts and the numerals 10 and 11 generally designate, respectively, front and rear car body sections which are pivoted jointly upon a transverse axis by means of pivot pins 13, whereby the front and rear sections may pivot relative to each other in a longitudinal vertical plane. The car body sections 10 and 11 have floor portions 15 and 16 respectively, and pivot pins 13 are preferably located close to the floor portions 15 and 16, as shown in Fig. 1, whereby the continuity of the floor 15, 16 is not substantially interrupted when the car sections pivot relative to each other.

The wheel suspension system of the car shown in the drawings comprises an intermediate truck assembly designated generally 18 in Figs. 1 and 3 and associated with the front end of the rear car portion 11. A rear truck assembly is designated generally 19 and is associated with the rear part of rear car portion 11 and a front truck designated generally 20 is associated with the front end of front car portion 10.

The intermediate truck assembly comprises a cross member 23 fixed to the underside of the rear car portion 11 and having lateral pairs of bearing brackets 24 for supporting longitudinally extending lateral arms 26. Each arm 26 has a front and rear caster bracket 27, each having a caster wheel 28. The lateral arms 26 are thus free to oscillate on the axes of bearing brackets 24 individually to suit variations in the contour of the runway over which the car is operating. The caster frames 27 and the wheels 28, as well as those to be described later, all are mounted with an inverse camber, as shown best in Fig. 4. This mounting positions the wheels in such manner that they engage perpendicularly against the curved runway upon which they travel.

Adjacent each caster bracket and wheel assembly each of the arms 26 has an inwardly extending bracket 30 and extension coil springs 31 extend from the inner end of each bracket 30 to anchoring formations 32 provided upon the caster brackets 27. The springs 31 stabilize the caster wheels 28 and tend to retain them in a straight longitudinal position, thus contributing to the desired self-steering arrangement of the caster wheels.

The front truck assembly 20 comprises a cross bar or frame 35 which has a central bearing 36 having a longitudinal axis. A front draw bar 38 has a clevis 40 at its rear end for pivotal engagement with the intermediate cross member 23 as at 41 and a pair of bearing brackets 43 and 44 are fixed to the under side of front car portion 10. Draw bar 38 is thus free to move endwise in bearings 43 and 44 upon relative oscillation of the car portions about axis 13 without disturbing the pivotal support of front cross member 35. Cross member 35 has caster brackets 48 at opposite sides thereof for supporting caster wheels 49. Each of the caster brackets 48 has a stabilizing spring arrangement 50 similar to that previously described.

The rear truck assembly 19 includes a pair of axially spaced bearing brackets 55 and 56, fixed to the under side of car portion 11, with a draw bar 57 extending therethrough longitudinally of the car. A collar and nut arrangement 60 at the front end of draw bar 57 confines a compression coil spring 61 and a similar spring 62 is retained at the rear end of draw bar 57 by an eye member 64 which cooperates with a clevis 65 and pin 66 associated with the front draw bar 38 of a rearwardly adjacent car.

A pivoted cross member 70 is mounted for oscillation on draw bar 57 between the bearing brackets 55 and 56 and its opposite ends comprise journals for receiving bearings 71 and 72 formed medially of a pair of longitudinally extending frame members 73 and 74, respectively. The frame members 73 and 74 have caster brackets 76 adjacent their front and rear ends, the caster brackets being provided with caster wheels 77 and stabilizing spring arrangements 78, again similar to the first-described stabilizing spring arrangement.

It will be seen from the foregoing that the pair of rear wheels 77 at one side of the car may raise and lower freely as a unit relative to the pair of rear wheels 77 at the other side of the car by oscillation of cross member 70. Also, the fore and aft rear wheels 77 at either side of the car may raise and lower freely relative to each other by oscillation of their longitudinal frame members about their medial bearings. This insures full road contact of all wheels despite variation in the contour of the curved runway on which the car is operating. Further, the load on rear truck assembly 19 is uniformly distributed over the four wheels 77.

The stabilizing springs 50, 31 and 78 are provided to insure self-steering and self-centering operation of one car or a train of cars operating over a curved or trough-like runway and to prevent the cars of a train from buckling or whipping out of line. The stabilizing springs are arranged to have initial tension and the degree of initial tension of the springs increases progressively from front to rear. That is, the springs 31 of the intermediate truck assembly 18 have greater initial tension than the springs 50 of front truck assembly 20. Also, the springs 78 of rear truck assembly 19 have greater initial tension than the springs 31 of intermediate truck assembly 18.

When a train of cars side slips from a banked turn these springs permit all cars to slip sidewise at the same time insuring that each car will maintain its alignment in the train. The tension of these springs also tends to keep the cars at the rear of the train on a steady course and overcomes the tendency to whip from side to side.

The rear car portion 11 includes sides 80 and a rear wall portion 81 which comprises a seat back for cooperation with a seat bottom 82. A forwardly extending slightly lower seat portion 84 provides a seat arrangement to accommodate two passengers in such manner that the occupant of seat bottom 82 may straddle the occupant of seat portion 84. It will be noted that the rear seat arrangement just described is located in such manner that the load borne thereby is disposed directly over the rear truck assembly 19.

Front car portion 10 likewise includes sides, designated 88, and a seat back 89 forms the medial portion of the rear closure of front car portion 10. At each side of seat back 89 a rearwardly opening foot well 90 completes the rear closure of front car portion 10 and the occupants of the rear car portion 11 may place their feet within the pair of foot wells 90. Seat back 89 cooperates with a seat bottom 92 and a lower forwardly extending seat bottom 94 is provided as in the case of the rear seat arrangement previously described.

The front car portion has an upwardly curving front wall 96 and a narrower central curving projecting portion 97 simulating a toboggan front and providing further foot space.

Each of the car portions is provided with lateral hand rails for the passengers. In the case of rear car portion 11 rigid hand rails 100 are provided which may be rigidly secured to the opposite side walls 80 in any desired manner. For the front car portion 10, hand rails 101 are pivoted at their rear ends to the front portions of the side walls 80 of the rear car portions, as at 102. Rails 101 are tubular and their front ends receive plungers 103 which have inward lateral projections 104 extending through longitudinal slots (not shown) in the walls of tubular rails 101, for pivotal engagement with bearing projections 106 formed or otherwise provided upon front wall 96. Compression coil springs 107 extending between plungers 103 and the rear ends of rails 101 yieldably resist undue upward pivotal movement of front car portion 10 about pivotal connection 13.

While stabilizing spring assemblies 50, 31 and 78 have been described in conjunction with the several truck assemblies, the multi-wheel arrangement shown and described herein is fully operative if the stabilizing spring assemblies be omitted entirely. With less uniform wheel support, as in prior cars of the present type, the stabilizing springs were essential to satisfactory operation. With the present car their use is purely optional.

What is claimed is:

1. An amusement ride car comprising front and rear body members connected in end to end relation for relative pivotal movement about a substantially horizontal transverse axis, said front body member having a pair of opposite caster wheels, said rear body member having a caster truck adjacent each end thereof, the truck at the forward end of said rear body member comprising a pair of lateral longitudinally extending arms each pivoted medially to said rear body member for pivotal movement in a plane substantially normal to the surface upon which the car moves and having a front and rear caster wheel, the truck at the rear end of said rear body member comprising a transverse support pivoted for oscillation about a substantially horizontal longitudinal axis, and a pair of lateral longitudinal arms pivoted medially to opposite ends of said support for pivotal movement relative thereto in a plane substantially normal to the surface upon which the car moves, each of said last mentioned arms having a front and a rear caster wheel.

2. An amusement ride car having a plurality of longitudinally spaced wheel supports, one of said supports comprising a transverse arm pivoted for oscillation about a substantially horizontal longitudinal axis and a pair of lateral longitudinal arms pivoted medially to opposite ends of said transverse arm for pivotal movement relative thereto in a plane substantially normal to the surface upon which the car moves, each of said lateral longitudinal arms having a front and a rear caster wheel.

3. An amusement ride car comprising articulated front and rear body members, said front body member having a pair of opposite caster wheels, said rear body member having a caster truck adjacent each end thereof, the truck at the forward end of said rear body member comprising a pair of lateral longitudinally extending arms each pivoted medially to said rear body member for pivotal movement in a plane substantially normal to the surface upon which the car moves and having a front and a rear caster wheel, the truck at the rear end of said rear body member comprising a transverse support pivoted for oscillation about a substantially horizontal longitudinal axis, and a pair of lateral longitudinal arms pivoted medially to opposite ends of said support for pivotal movement relative thereto in a plane substantially normal to the surface upon which the car moves, each of said last mentioned arms having a front and a rear caster wheel.

4. An amusement ride car comprising a body member having a caster truck adjacent each end thereof, the truck at the forward end comprising a pair of lateral longitudinally extending arms each pivoted medially to said body member for pivotal movement in a plane substantially normal to the surface upon which the car moves and having a front and a rear caster wheel, the truck at the rear end of said other member comprising a transverse support pivoted for oscillation about a substantially horizontal longitudinal axis, a pair of lateral longitudinal arms pivoted medially to opposite ends of said support for pivotal movement relative thereto in a plane substantially normal to the surface upon which the car moves, each of said last mentioned arms having a front and a rear caster wheel.

NORMAN BARTLETT.

REFERENCES CITED

The following references are of record in the file of this patent:

UNITED STATES PATENTS

| Number | Name | Date |
| --- | --- | --- |
| 1,814,969 | Schmeck | July 14, 1931 |
| 1,839,054 | Schmeck | Dec. 29, 1931 |
| 1,959,944 | Bartlett | May 22, 1934 |
| 2,081,261 | Bartlett | May 25, 1937 |